April 26, 1966    DE LANE D. PATTON    3,248,137
BALL JOINT
Filed Dec. 23, 1964    2 Sheets-Sheet 1
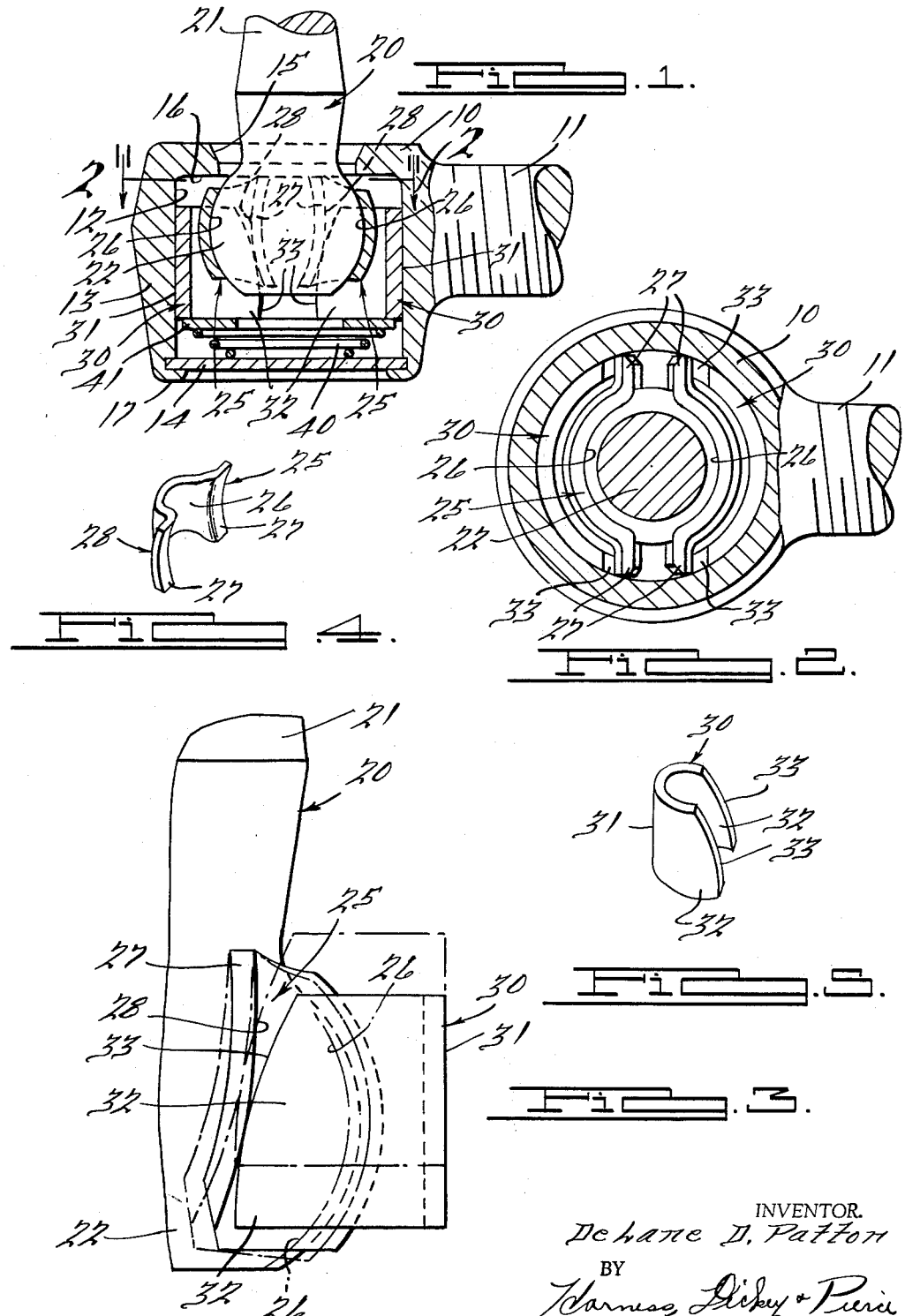
INVENTOR.
De Lane D. Patton
BY
Harness, Dickey & Pierce
ATTORNEYS.

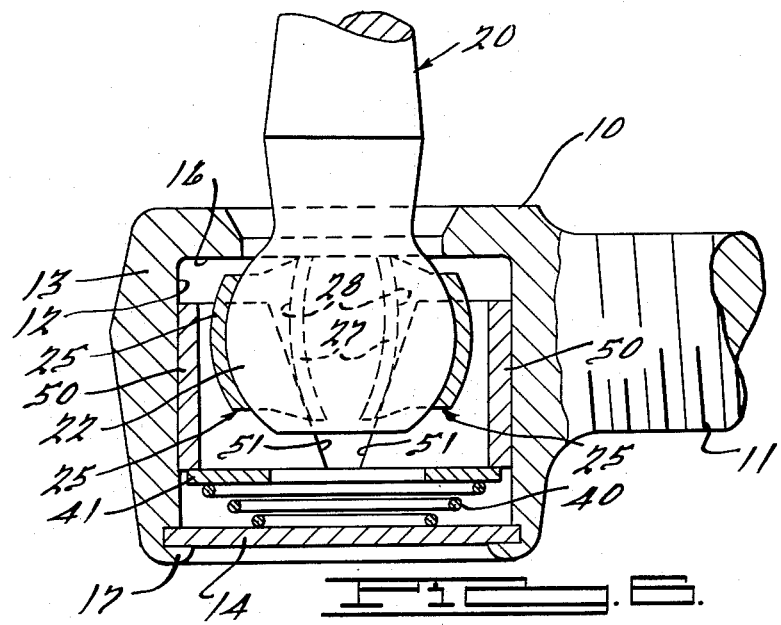
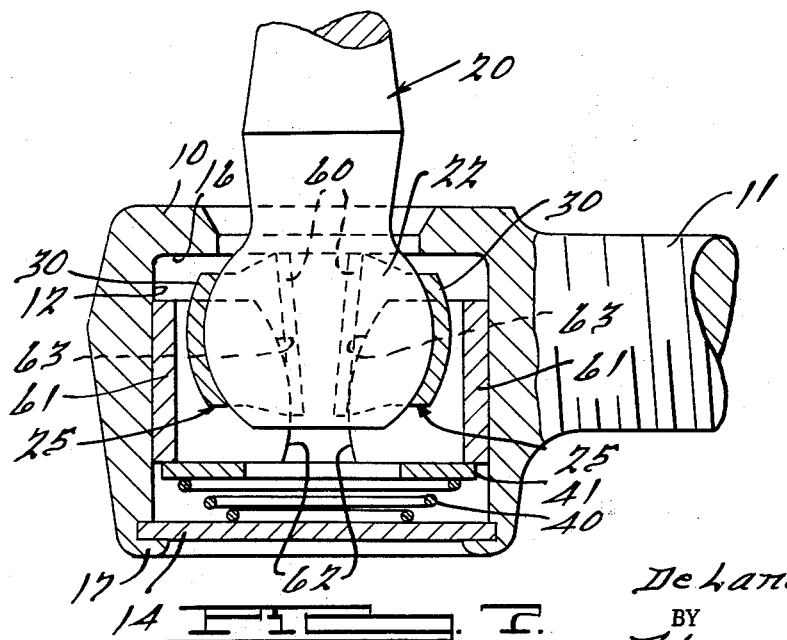

United States Patent Office 3,248,137
Patented Apr. 26, 1966

3,248,137
BALL JOINT
De Lane D. Patton, Worthington, Ohio, assignor to The Columbus Auto Parts Company, Columbus, Ohio, a corporation of Ohio
Filed Dec. 23, 1964, Ser. No. 423,898
2 Claims. (Cl. 287—87)

This is a continuation-in-part of my patent application Serial No. 344,752, filed February 13, 1964, now abandoned.

This invention relates to ball joints and, fore particularly, to a ball joint adapted for use in vehicle steering linkage assemblies and the like.

In ball joints of this general type, the ball stud must be free to rotate and move angularly with respect to the housing. Moreover, the automobile manufacturers specify that the ball stud be held with a force sufficient to require the application of a specified torque to produce rotation of the stud. These specifications also require that the specified torque, or a substantial percentage thereof, be maintained throughout the life of the joint.

It is, therefore, an object of the present invention to provide a ball joint of this type having a ball seat or ball engaging members grippingly supporting the ball of a ball stud in such a manner as to permit rotation of the ball and angular movement thereof and having means for adequately compensating for wear in the parts to maintain a relatively constant gripping force on the ball of the stud.

Another object of the invention is to provide a joint of this type in which many of the parts may be made from relatively inexpensive stampings.

Another object of the invention is to provide a joint which is so reduced in the number and character of its component parts as to approach the ultimate in structural simplicity and thus may be manufactured and assembled at a very nominal cost.

The various objects and advantages and the novel details of construction of several commercially practical embodiments of the invention, will become more apparent as this description proceeds, especially when considered in connection with the accompanying drawings, in which:

FIGURE 1 is a longitudinal vertical sectional view through a joint embodying the present invention, certain of the parts being in elevation;

FIGURE 2 is a sectional view taken substantially on the plane indicated by line 2—2 of FIGURE 1;

FIGURE 3 is an enlarged fragmentary view showing the operative connection between the ball engaging members and the wedge members;

FIGURE 4 is a perspective view of one of the ball engaging members;

FIGURE 5 is a perspective view of one of the wedge members;

FIGURE 6 is a view similar to FIGURE 1 of a slightly modified form of construction; and FIGURE 7 is a similar view showing another modification.

Referring now particularly to FIGURE 1 of the drawings, it will be noted that the invention comprises a housing 10 which may be, and preferably is, manufactured from forged steel or the like and is showing as being provided with on integrally formed arm 11 which may comprise a rod socket and arm or other steering linkage part. The housing 10 is formed with a cavity 12 defined by a cylindrical enclosing wall 13. The housing 10 is adapted to be closed at one end by a closure member 14, and is provided at its other end with an aperture or opening 15 surrounded by a flange forming an annular shoulder 16. As initially forged, the lower end of the housing, as seen in FIGURE 1, is open and after the joint is assembled, this open end is closed by the closure member 14 which is secured in place by crimping or peening over the housing 10, as indicated at 17.

The reference character 20 indicates a headed stud provided with a stud portion 21 at one end and a ball head 22 at the other end. The stud portion 21 is adapted to be connected to a pitman arm or rod or other steering linkage (not shown).

The reference character 25 indicates a pair of ball engaging seat members, each formed with a segmentally spherical inner surface 26 and with a pair of opposed outwardly extending flanges, shoulders or extensions 27. As shown best in FIGURES 1 and 4, these flanges extend longitudinally in a direction coincident with the axis of the stud 20 and are curved longitudinally to form arc-shaped surfaces 28.

The reference character 30 indicates a pair of wedge members substantially channeled or U-shaped in cross section to provide an outer wall 31 which is parallel with and adapted to engage the inner surface of the cavity 12 formed by the wall 13. Each of these wedge members is provided with a pair of wedge portions 32 which are generally inclined from the lower ends thereof towards the upper ends thereof, as best illustrated in FIGURES 1 and 5. Upward movement of the wedge members 30, as view in FIGURE 1, will cause the ball seat members 25 to move towards one another to take up wear between these ball seat members and the ball head 22. The wedge portions 32 of the wedge members 30 are also provided with longitudinally curved surfaces 33 which form arcs curved in an opposite direction or opposed to the arc surfaces 28 of the ball seat members. Thus, the curved or arcuate surfaces 33 of the wedge members tangentially engage the arcuate surfaces 28 of the ball seat members.

By this arrangement, the ball seat members 25 may pivot or rock on the arcuate surfaces 33 of the wedge members so as to completely and adequately adjust and position themselves with respect to the ball head 22. Because the engagement between the arcuate surfaces 28 and the arcuate surfaces 33 is a tangential one, the friction between the ball seat members and the wedge members, during relative sliding movement, is reduced to a minimum. This reduction in the friction between these parts provides a more effective and smoother take-up action of the ball seat members, as practically all friction between the parts 25 and 30 is eliminated.

For biasing the wedge members 30 into operative position, there is provided a spring 40 bearing against a washer or plate member 41 which engages the adjacent ends of both wedge members 30, the other end of the spring bearing against the closure member 14 previously referred to. Thus, both wedge members are simultaneously urged in an upward direction, as view in FIGURE 1, so as to engage the wedge surfaces thereof with the flanges 27 on the ball seat members 25.

In assembling the joint, the stud is inserted through the lower open end, as viewed in FIGURE 1, and the seat members 25 and wedge members 30 are assembled therewith together with the plate 41 and spring 40, whereupon the closure is secured to the body 10 by crimping or peening the body over, as indicated at 17.

It will be obvious from the foregoing that the major portions of the device comprising the ball seat members 25, wedge members 30, plate member 41 and closure 14 may be made from relatively inexpensive stampings and also that the device may be quickly and easily assembled.

The form of construction illustrated in FIGURE 6 is similar to that illustrated in FIGURE 1 in most respects, similar reference characters being used on similar parts for the purpose of simplification.

In this form of construction, the ball engaging seat members 25 engage the ball head 22 as in the previously described construction and each of the members 25 is provided with a pair of opposed outwardly extending flanges 27 which extend longitudinally of the stud axis. These flanges are curved longitudinally or in the direction of the axis of the stud to form arc-shaped surfaces 28.

The reference character 50 indicates a pair of wedge members substantially channel or U-shaped in cross section adapted to engage the inner surface of the cavity 12 formed by the wall 13 of the housing. Each of the wedge members 50 is provided with a wedge surface 51 which is generally inclined from the lower end thereof toward the upper end thereof, as best illustrated in FIGURES 1 and 6. Instead of the wedge surfaces 51 being curved, as shown in FIGURE 1, they have straight or planar surfaces which tangentially engage the arc-shaped surfaces 28 on the flanges 27 of the ball-engaging seat members 25. Thus, while the surfaces 51 of the wedge members 50 are not curved to form arcs, they provide a tangential engagement with the flanges 27 on the ball engaging seat members, so that these members may pivot or rock on the wedge members so as to completely and adequately adjust and position themselves with the ball head 22.

Upward movement of the wedge members 50, as viewed in FIGURE 6, will cause the ball seat members 25 to move towards one another to take up wear between these ball seat members and the ball head 22. However, the construction is such that the curved surfaces 28 of the flanges 27 of the ball seat members have a tangential engagement with the adjacent surfaces of the wedges so that the ball seat members may pivot or rock on these arcuate surfaces 28.

In the form of construction illustrated in FIGURE 7, the ball seat engaging members 25 are provided with straight or planar flanges 60. In this form of construction, these flanges are straight instead of being curved longitudinally of the axis of the stud. In this form of construction, the wedge members 61 are provided with a pair of wedge portions 62 which are generally inclined from the lower ends thereof towards the upper ends, as viewed in FIGURE 7. The wedge portions 62 of the wedge members 61 are each provided with a longitudinally curved surface 63 similar to the surfaces 33 in the form of construction illustrated in FIGURE 1. Thus, the curved or arcuate surfaces 63 of the wedge members tangentially engage the straight or planar flanges 60 of the ball engaging seat members 25. Thus, there is a tangential engagement between the parts which permits the ball seat engaging members 25 to pivot or rock on the surfaces 63 so as to completely and adequately adjust and position themselves with respect to the ball head 22.

From the foregoing, it will be apparent that the arcuate surfaces may, as shown in FIGURE 1, be applied to both the ball engaging seat members and to the wedge members. In FIGURE 6, these arcuate surfaces are applied only to the ball engaging seat members 25; whereas, in FIGURE 7, these curved surfaces are applied only to the wedge surfaces of the wedge members 30.

Relative adjustment between the wedge members and ball engaging seat members is accomplished with all of the constructions, as described in connection with FIGURE 1, as will be apparent. The advantage of the constructions shown in FIGURES 6 and 7 is that they simplfy the production of the joint.

While several commerically practical embodiments of the invention have been described and illustrated herein somewhat in detail, it will be understood that various other changes may be made as may come within the purview of the accompanying claims.

What is claimed is:

1. A ball and socket joint comprising a housing having a wall defining a cylindrical cavity provided with a reduced opening at one end thereof and closure means at the other end thereof, a stud extending through said opening and having a ball head at one end thereof located in said cavity, a pair of ball engaging bearing seat numbers mounted in said housing on opposite sides of said ball head, each ball seat number being channel-shaped with the channel portion formed by a segmental spherical surface, and the opposed longitudinally extending edges of said channel portion extending radially outwardly of the channel axis to form a pair of opposed flanges, said flanges extending the length of said channel, the ends of said ball seat members adjacent the ends of said cavity being recessed to prevent interference between said ball seat members and the edge of said opening, the ends of said ball seat members also being spaced from the opposite ends of said cavity, said flanges being curved longitudinally of the stud axis to form arcs, a pair of of channel shaped wedge members slidably interposed between said ball seat members and the wall of said cavity with the longitudinally extending edges of said wedge members being provided with wedge portions curved longitudinally of the stud axis to form arcs extending in a direction opposite to said first mentioned arcs, and tangentially engaging said first mentioned arcs whereby said ball engaging bearing seat members may pivot about said wedge members during the adjustment of said ball engaging bearing seat members, the ends of said wedge members also being spaced from the opposite ends of said cavity, and means between the wedge members and the other end of the housing for biasing said wedge members into engagement with said flanges to move said ball engaging bearing seat members in a direction to take up any wear between said seat members and said ball head.

2. A ball and socket joint comprising, a housing having a wall defining a cylindrical cavity provided with a reduced opening at one end thereof and closure means of the opposite end thereof, a stud extending through said opening and having a ball head at one end thereof located in said cavity, a pair of ball engaging bearing seat members mounted in said housing, each ball seat member being channel-shaped with the channel portion formed by a segmental spherical surface, and the longitudinally extending opposed edges of said channel portion extending radially outwardly of the channel axis to form a pair of opposed flanges, said flanges extending longitudinally the length of said channel and provided with a set of wedge engaging surface portions, the ends of said ball seat members adjacent the ends of said cavity being recessed to prevent interference between said ball seat members and the edge of said opening, the ends of said ball seat members also being spaced from the opposite ends of said cavity, a pair of channel-shaped wedge members having their ends spaced from the ends of the cavity slidably interposed between said ball engaging seat members and the wall of said cavity and with the longitudinally extending edges of said wedge members providing a set of longitudinally extending wedge surface portions, one set of said surface portions being arcuately curved longitudinally of the stud axis and the other set of said surface portions being planar and tangentially engaging the other set of surface portions whereby said ball engaging bearing seat members may pivot about said wedge members during the adjustment of said ball engaging bearing seat members, and means between the wedge members and the other end of the housing for biasing said wedge members into engagement with said flanges to move said ball engaging bearing seat members in a direction to take up any wear between said seat members and said ball head.

References Cited by the Examiner

UNITED STATES PATENTS

| 275,867 | 4/1883 | Steinmetz et al. | 308—69 |
| 640,059 | 12/1899 | Whitney. | |
| 1,894,309 | 1/1933 | Flumerfelt. | |
| 1,918,395 | 7/1933 | Hufferd et al. | |
| 2,096,966 | 10/1937 | Hufferd. | |

CARL W. TOMLIN, *Primary Examiner.*